United States Patent
Shen et al.

(10) Patent No.: US 10,793,079 B1
(45) Date of Patent: Oct. 6, 2020

(54) ASSEMBLING STRUCTURE FOR VEHICLE CARRYING DEVICE

(71) Applicant: KING ROOF INDUSTRIAL CO., LTD., Taichung (TW)

(72) Inventors: Shih-Chieh Shen, Taichung (TW); Chun-Yi Hsieh, Taichung (TW)

(73) Assignee: KING ROOF INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/599,441

(22) Filed: Oct. 11, 2019

(51) Int. Cl.
*B60D 1/52* (2006.01)
*B60R 9/10* (2006.01)
*B60D 1/24* (2006.01)

(52) U.S. Cl.
CPC .............. *B60R 9/10* (2013.01); *B60D 1/241* (2013.01); *B60D 1/52* (2013.01)

(58) Field of Classification Search
CPC .... B60R 9/06; B60R 9/10; B60D 1/52; B60D 1/241
USPC ................................. 224/519; 280/504, 506
See application file for complete search history.

(56) References Cited

U.S. PATENT DOCUMENTS

| | | | |
|---|---|---|---|
| 5,333,888 A * | 8/1994 | Ball | B60D 1/52 280/504 |
| 5,344,175 A * | 9/1994 | Speer | B60D 1/58 224/521 |
| 5,423,566 A * | 6/1995 | Warrington | B60D 1/52 224/521 |
| 6,835,021 B1 * | 12/2004 | McMillan | B60D 1/155 280/504 |
| 6,974,147 B1 * | 12/2005 | Kolda | B60D 1/52 280/506 |
| 7,004,491 B1 * | 2/2006 | Allsop | B60D 1/52 280/491.2 |
| 7,448,640 B2 * | 11/2008 | Weaver | B60D 1/06 280/506 |
| 7,600,774 B1 * | 10/2009 | Speer | B60D 1/155 280/493 |
| 8,141,760 B2 * | 3/2012 | Kuschmeader | B60R 9/10 224/497 |
| 8,262,121 B2 * | 9/2012 | Beck | B60D 1/06 280/504 |
| 8,308,185 B2 * | 11/2012 | Weaver | B60D 1/241 280/506 |
| 8,419,041 B2 * | 4/2013 | Bessette | B60D 1/52 280/507 |

(Continued)

*Primary Examiner* — Justin M Larson
(74) *Attorney, Agent, or Firm* — Muncy, Geissler, Olds & Lowe, P.C.

(57) ABSTRACT

An assembling structure for vehicle carrying device is provided, including: a tubular member, having an axial direction, configured to be inserted within a trailer hitch of a vehicle, a wall of the tubular member having a through hole; a first abutting member, being movable along the axial direction and disposed in the tubular member; an expansion mechanism, including a second abutting member movably disposed on the first abutting member, the second abutting member being located within the through hole and urgeable to move by the first abutting member; an actuating member, being connected with the first abutting member, configured to be externally operable to drive the first abutting member to move axially and urge the second abutting member to move radially.

9 Claims, 10 Drawing Sheets

(56) References Cited

U.S. PATENT DOCUMENTS

| | | | | |
|---|---|---|---|---|
| 8,596,664 | B2* | 12/2013 | Lahn | B60D 1/52 |
| | | | | 280/506 |
| 8,696,011 | B2* | 4/2014 | Despres | B60D 1/06 |
| | | | | 280/478.1 |
| 8,833,791 | B2* | 9/2014 | Prescott | B60D 1/07 |
| | | | | 280/506 |
| 8,944,516 | B2* | 2/2015 | Eidsmore | B60P 1/28 |
| | | | | 298/1 A |
| 9,027,950 | B2* | 5/2015 | Lahn | B60D 1/52 |
| | | | | 280/506 |
| 9,376,063 | B2* | 6/2016 | Hein | B60R 9/06 |
| 9,616,722 | B2* | 4/2017 | Williams | B60D 1/52 |
| 9,663,040 | B1* | 5/2017 | Shen | B60R 9/06 |
| 9,963,082 | B2* | 5/2018 | Inagaki | B60R 9/10 |
| 10,099,525 | B1* | 10/2018 | Phillips | B60D 1/26 |
| 10,647,263 | B2* | 5/2020 | Viklund | B60R 9/10 |
| 2009/0302078 | A1* | 12/2009 | Wang | B60R 9/10 |
| | | | | 224/502 |

* cited by examiner

ASSEMBLING STRUCTURE FOR VEHICLE CARRYING DEVICE

BACKGROUND OF THE INVENTION

Field of the Invention

The present invention relates to an assembling structure for a vehicle carrying device.

Description of the Prior Art

A vehicle carrying device such as a bicycle carrier is detachably assembled behind a vehicle by a trailer hitch mounted on the vehicle for carrying bicycles. A conventional bicycle carrier includes a connecting rod which is insertable into the trailer hitch, and the connecting rod and the trailer hitch are connected with each other by a pin member transversely penetrating therethrough. However, the connecting rod and the trailer hitch can shake relative to each other when the vehicle is moving, which results in loosing of the pin member and poor assembling stability. The pin member has to be rotated by a hand tool to tighten with the trailer hitch, which is inconvenience for operation. In addition, the connecting rod of the conventional bicycle carrier has a fixed diametric dimension which can only be applied to a fixed size of the trailer hitch. Even if the connecting rod is assembled to the trailer hitch with corresponding size, the connecting rod cannot be stably abutted against an inner wall of the trailer hitch due to long-term expansion or inaccuracy in manufacturing, which causes the bicycle carrier to shake easily when the vehicle is moving.

The present invention is, therefore, arisen to obviate or at least mitigate the above-mentioned disadvantages.

SUMMARY OF THE INVENTION

The main object of the present invention is to provide an assembling structure for a vehicle carrying device which provides stable connection and is highly compatible.

To achieve the above and other objects, the present invention provides an assembling structure for a vehicle carrying device, including: a tubular member, a first abutting member, an expansion mechanism and an actuating member. The tubular member has an axial direction and is configured to be inserted within a trailer hitch of a vehicle, and a wall of the tubular member has a through hole. The first abutting member is movable along the axial direction and disposed in the tubular member. The expansion mechanism includes a second abutting member movably disposed on the first abutting member, and the second abutting member is located within the through hole and urgeable to move by the first abutting member. The actuating member is connected with the first abutting member and configured to be externally operable to drive the first abutting member to move axially and urge the second abutting member to move radially.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 10 for a preferable embodiment of the present invention. An assembling structure 1 for a vehicle carrying device of the present invention includes a tubular member 10, a first abutting member 20, an expansion mechanism 30 and an actuating member 40.

The tubular member 10 has an axial direction and is configured to be inserted within a trailer hitch 2, 2a of a vehicle, and a wall of the tubular member 10 has a through hole 11. The first abutting member 20 is movable along the axial direction and disposed in the tubular member 10. The expansion mechanism 30 includes a second abutting member 31 movably disposed on the first abutting member 20, and the second abutting member 31 is located within the through hole 11 and urgeable to move by the first abutting member 20. The actuating member 40 is connected with the first abutting member 20 and configured to be externally operable to drive the first abutting member 20 to move axially and urge the second abutting member 31 to move radially. Therefore, the tubular member 10 and the trailer hitch 2, 2a are stably connected with each other, and the assembling structure 1 is highly compatible.

The tubular member 10 is square. The through hole 11 is disposed at a corner of the tubular member 10, and the second abutting member 31 is connected with a corner of the first abutting member 20 corresponding to the through hole 11 so that the first abutting member 20 and the second abutting member 31 are radially and diagonally abuttable against each other and stable. At least one of the first abutting member 20 and the second abutting member 31 includes an inclined portion 21 tilted to the axial direction, and the other of the first abutting member 20 and the second abutting member 31 includes an abutting portion 311 which is abuttable against the inclined portion 21. When the first abutting member 20 is moved along the axial direction, the abutting portion 311 is moved along the inclined portion 21 and the expansion mechanism 30 is radially abutted against an inner surface of the trailer hitch 2, 2a. Therefore, the trailer hitch 2, 2a and the tubular member 10 can be tightly connected with each other when diametric dimensions of the trailer hitch 2, 2a and the tubular member 10 are different from each other. However, the through hole and the second abutting member may be correspondingly disposed at the same side of the tubular member. Specifically, the inclined portion 21 includes two inclined guiding surfaces 211 which are adjacent to each other and tilted to the axial direction, and the abutting portion 311 includes two inclined abutting surfaces 312 which are abuttable against the two inclined guiding surfaces 211. When the first abutting member 20 and the second abutting member 31 are moved relative to each other, the two inclined guiding surfaces 211 urge the two inclined abutting surfaces 312. In this embodiment, the first abutting member 20 has the inclined portion 21, and the second abutting member 31 has the abutting portion 311; the inclined portion 21 is a wedge projection, and the abutting portion 311 is a recession within which the wedge projection is received so that the wedge projection and the recession are stably abutted against each other and not easy to dislocate relative to each other. In other embodiments, the inclined portion and the abutting portion may be configured as inclined planes or arcuate convex surfaces.

One of the first abutting member 20 and the second abutting member 31 has an elongate hole 22 extending obliquely relative to the axial direction, a guiding member 221 is movably disposed within the elongate hole 22, and the guiding member 221 is connected with the other of the first abutting member 20 and the second abutting member 31. Therefore, when the first abutting member 20 urges the second abutting member 31 to move radially, the guiding member 221 is movable within the elongate hole 22 to guide the second abutting member 31. Specifically, the guiding member 221 includes a head portion 222 and a body portion 223 connected with the head portion 222, and an inner surface of the elongate hole 22 has a shoulder 224 which is abuttable against the head portion 222 so as to prevent the second abutting member 31 from departing from the first abutting member 20.

The actuating member 40 includes an operating portion 41 configured to be externally operable and a rod member 42 non-rotatably connected with the operating portion 41. The rod member 42 is screwed with one of the tubular member 10 and the first abutting member 20 so as to drive the first abutting member 20 to move axially relative to the tubular member 10. Therefore, a radial position of the second abutting member 31 is adjustable by rotating the operating portion 41, which is easy to operate. In this embodiment, the rod member 42 and the first abutting member 20 are screwed with each other; when the operating portion 41 is rotated, the first abutting member 20 which is square is non-rotatable relative to the tubular member 10 and moved toward or away from the operating portion 41 along the axial direction. However, the rod member may be screwed to the tubular member and axially comovable with the first abutting member. An outer peripheral surface of the first abutting member 20 preferably has a plurality of notches 23 spaced apart from one another so as to have a light weight and reduce frictions with the wall of the tubular member 10 for smooth movement.

The assembling structure 1 further includes a pin member 50 configured to laterally connect the trailer hitch 2, 2a and the tubular member 10. The first abutting member 20 has a penetrating hole 24 disposed laterally therethrough and extending axially, and the pin member 50 is disposed through the penetrating hole 24 and the first abutting member 20 is axially movable relative to the pin member 50 so as to provide stable connection and prevent the tubular member 10 from withdrawing from the trailer hitch 2, 2a. In this embodiment, the pin member 50 is a screwed rod which is configured to be screwed with at least one of the tubular member 10 and the trailer hitch 2, 2a, and an annular pad 51 is configured to be disposed between a head of the screwed rod and the trailer hitch 2, 2a. The annular pad 51 includes a ring 511 and a plurality of fins 512 which are radially tilted and disposed circumferentially on the ring 511 so that the plurality of fins 512 are elastically deformable and connected between the head of the screwed rod and an outer wall of the trailer hitch 2, 2a in a manner of multi-points connection for stable connection.

The expansion mechanism 30 further includes a spacer 32 which is detachably connected to the second abutting member 31, and the spacer 32 protrudes beyond an outer surface of the tubular member 10 and is configured to be abutted against the inner surface of the trailer hitch 2, 2a, which increase a maximum diametric dimension of the assembling structure 1 for applying to the trailer hitches 2, 2a with different sizes. When a diametric dimension of the trailer hitch is small, the spacer 32 may be detached from the second abutting member 31 and the second abutting member 31 is directly abutted against the inner wall of the trailer hitch. One of the spacer 32 and the second abutting member 31 has an engaging convex 321, and the other of the spacer 32 and the second abutting member 31 has an engaging concave 313 within which the engaging convex 321 is engageable for easy assembling. In this embodiment, the spacer 32 is connected on a side wall of the second abutting member 31; the engaging convex is a dovetailed tenon, and the engaging concave 313 is a dovetailed groove which is engageable with the dovetailed tenon, which is simple in structure and easy to process. Preferably, the spacer 32 further has a dodge slot 322, and the dodge slot 322 is configured to receive a fastener connecting the spacer 32 and the second abutting member 31 so as to increase assembling stability and prevent the fastener from protruding beyond the side wall of the second abutting member 31. In other embodiments, the spacer may be L-shaped and connected to a corner of the second abutting member corresponding to the through hole so as to be diagonally abutted against the inner wall of the trailer hitch.

The expansion mechanism 30 further includes a supporting frame 33 which is detachably connected to the tubular member 10, and the supporting frame 33 is connected to at least one outer side surface of the tubular member 10 and configured to be abutted against the inner surface of the trailer hitch 2, 2a, which increase the maximum diametric dimension of the assembling structure 1 for applying to the trailer hitches 2, 2a with different sizes. Specifically, the supporting frame 33 includes an assembling portion 331 which is configured for at least one fastener to be disposed therethrough and connected to the wall of the tubular member 10 and two supporting portions 332 which are transversely connected to two opposite sides of the assembling portion 331. Each of the two supporting portions 332 extends along a thickness direction of the assembling portion 331 and is abutted against and between the outer surface of the tubular member 10 and the inner surface of the trailer hitch 2, 2a. The supporting frame 332 and the spacer 32 are disposed on two opposite corners of the tubular member 10. Therefore, the supporting frame 33, the tubular member 10 and the trailer hitch 2, 2a are not easy to shake relative to one another and have preferable structural stability. In this embodiment, the two supporting portions 332 and the assembling portion 331 define a receiving portion 333 therebetween for receiving the at least one fastener so as to prevent the at least one fastener from protruding beyond the two supporting portions 332; the supporting frame 33 is integrally made in one piece so as to have preferable structural strength; each of the two supporting portions 332 includes at least one hollow portion 334 extending axially, which reduces manufacturing cost and a weight of the supporting frame 33.

Figure 1:
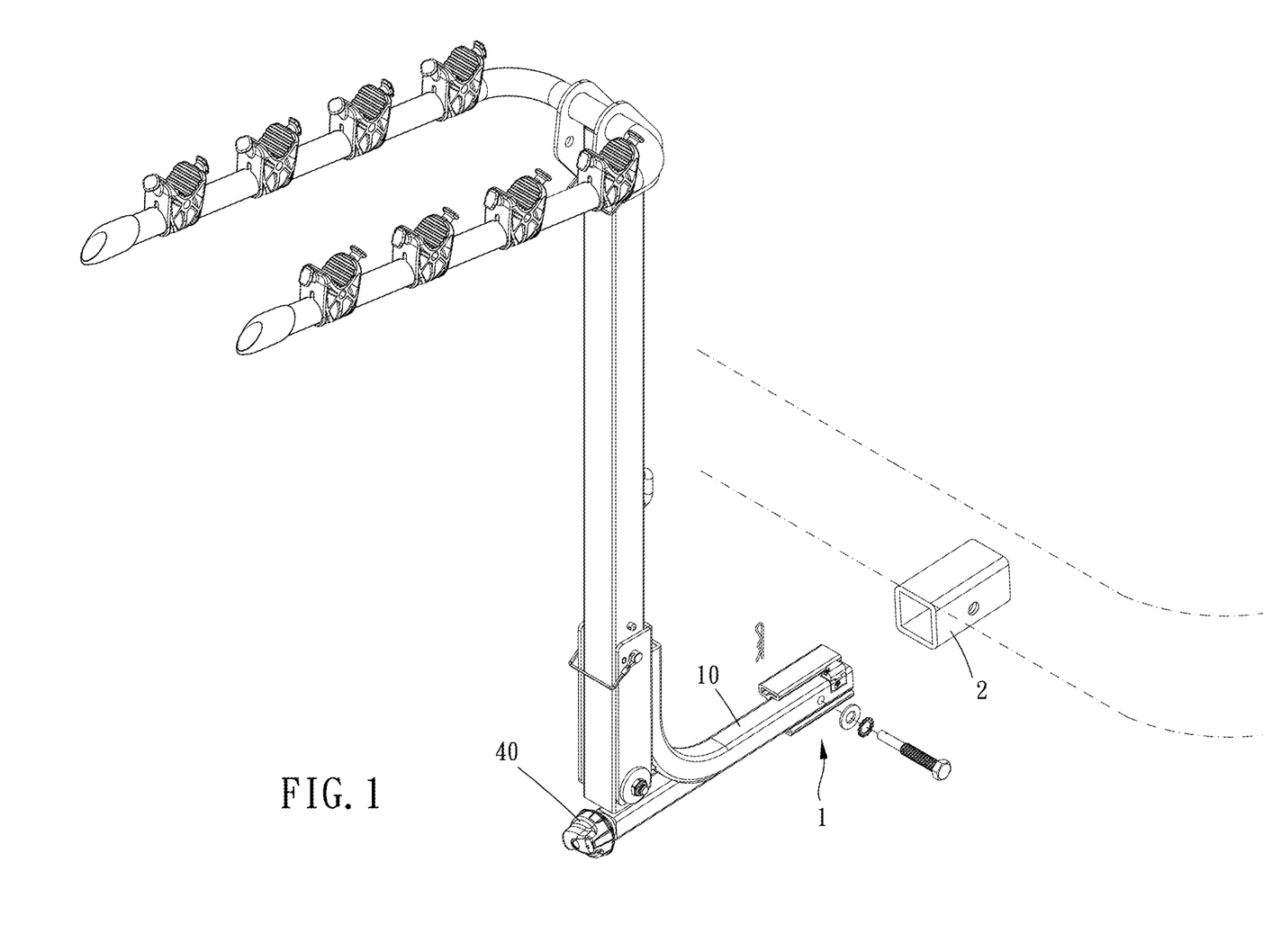
FIG. 1 is a stereogram of a preferable embodiment of the present invention.
Figure 2:
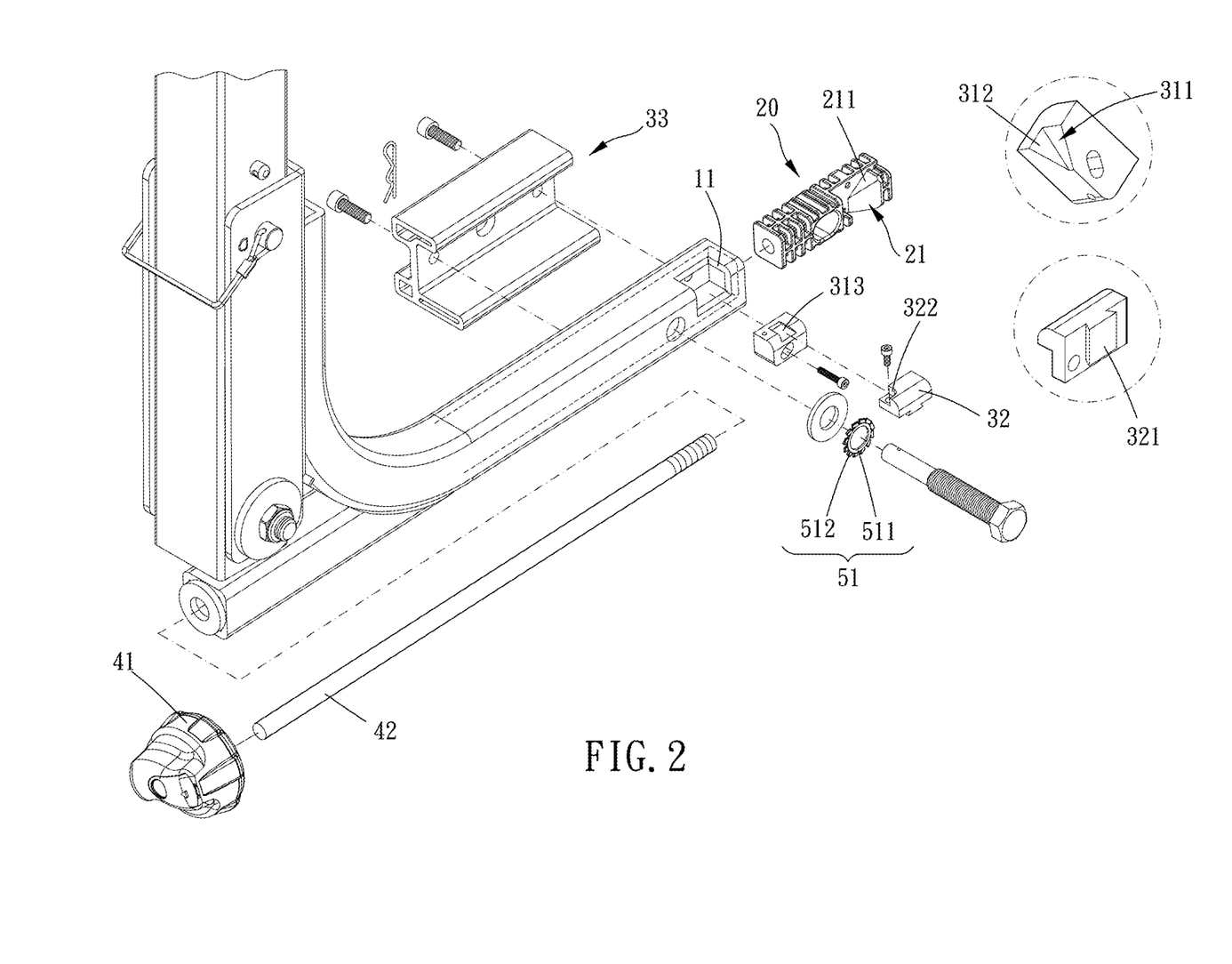
FIG. 2 is a breakdown drawing of a preferable embodiment of the present invention.
Figure 3:
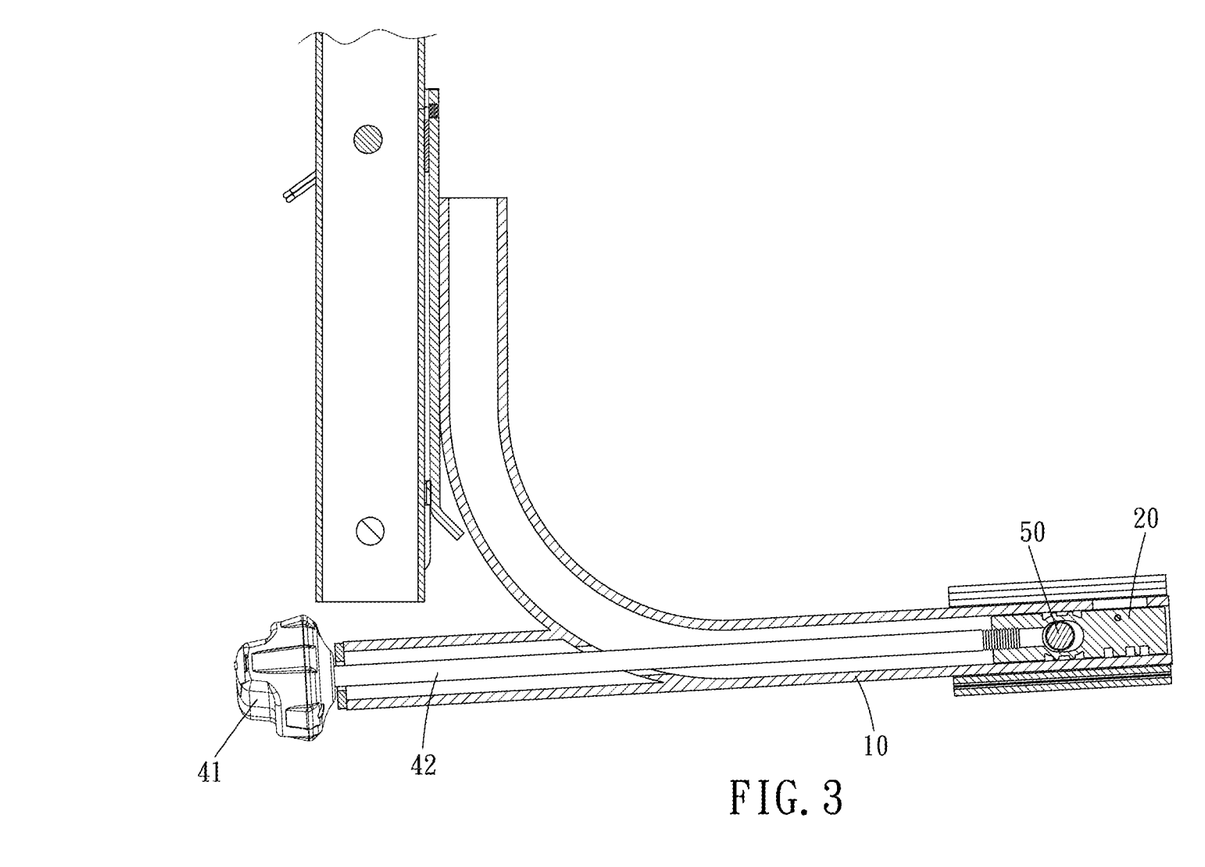
FIG. 3 is a cross-sectional view of a preferable embodiment of the present invention.
Figure 4:
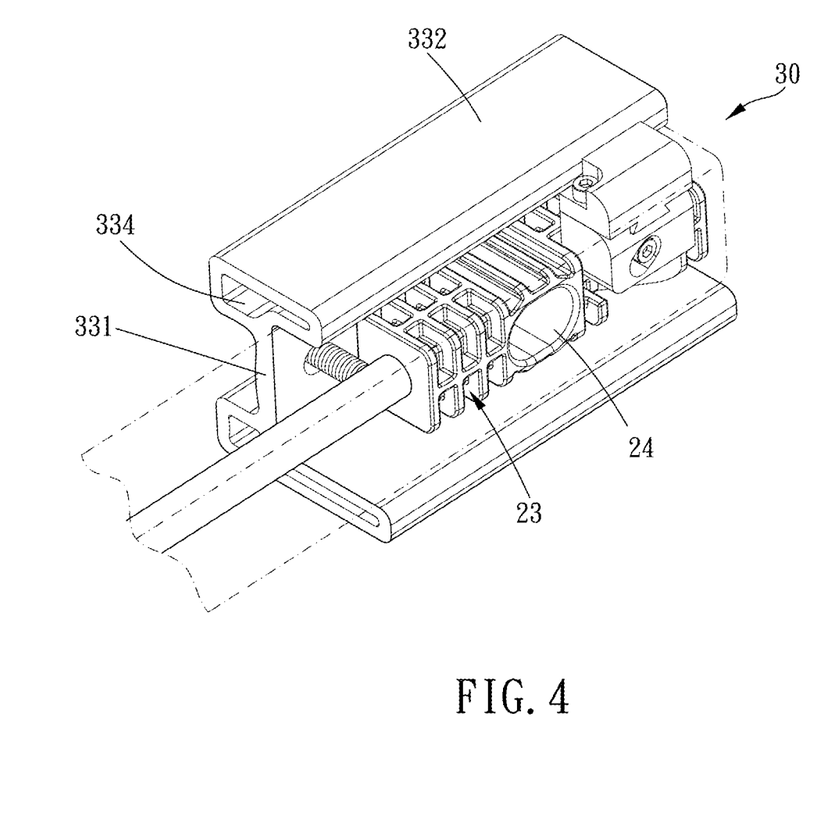
FIG. 4 is a partial enlargement of a preferable embodiment of the present invention.
Figure 5:
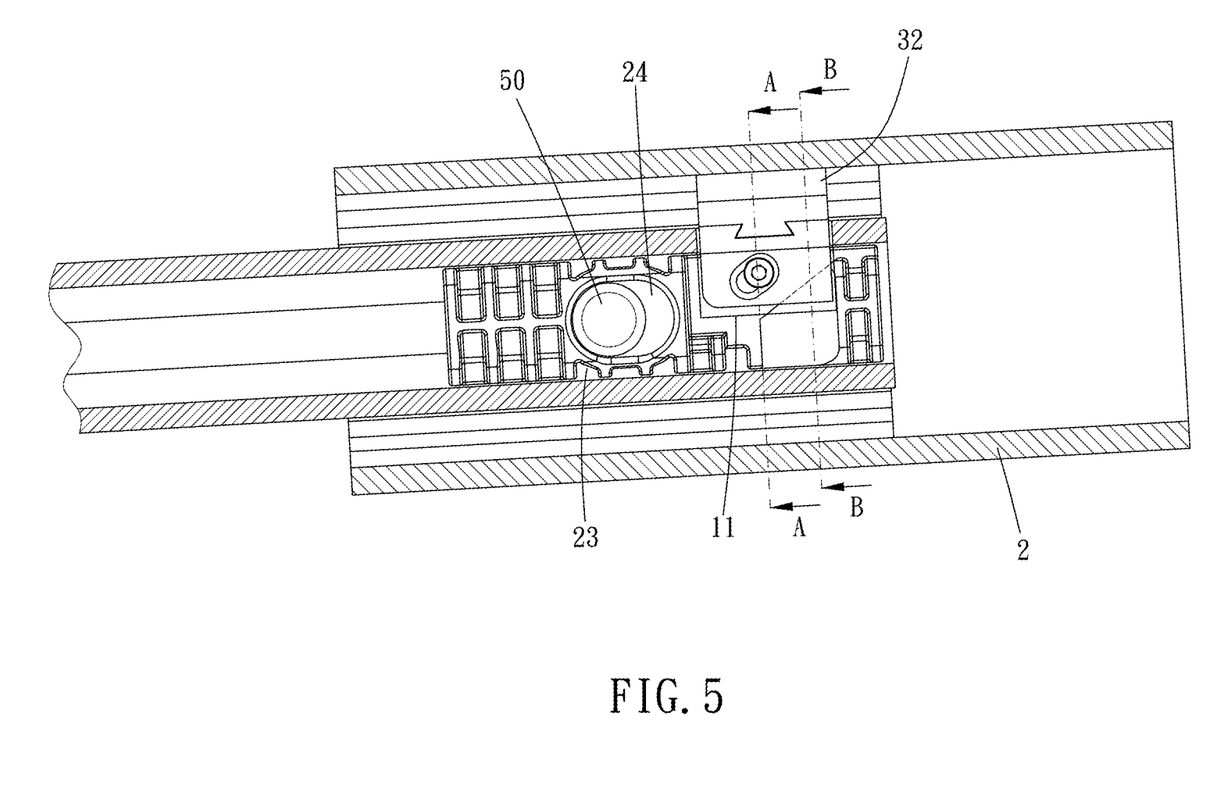
FIG. 5 is a partial cross-sectional view of a preferable embodiment of the present invention.
Figure 6:
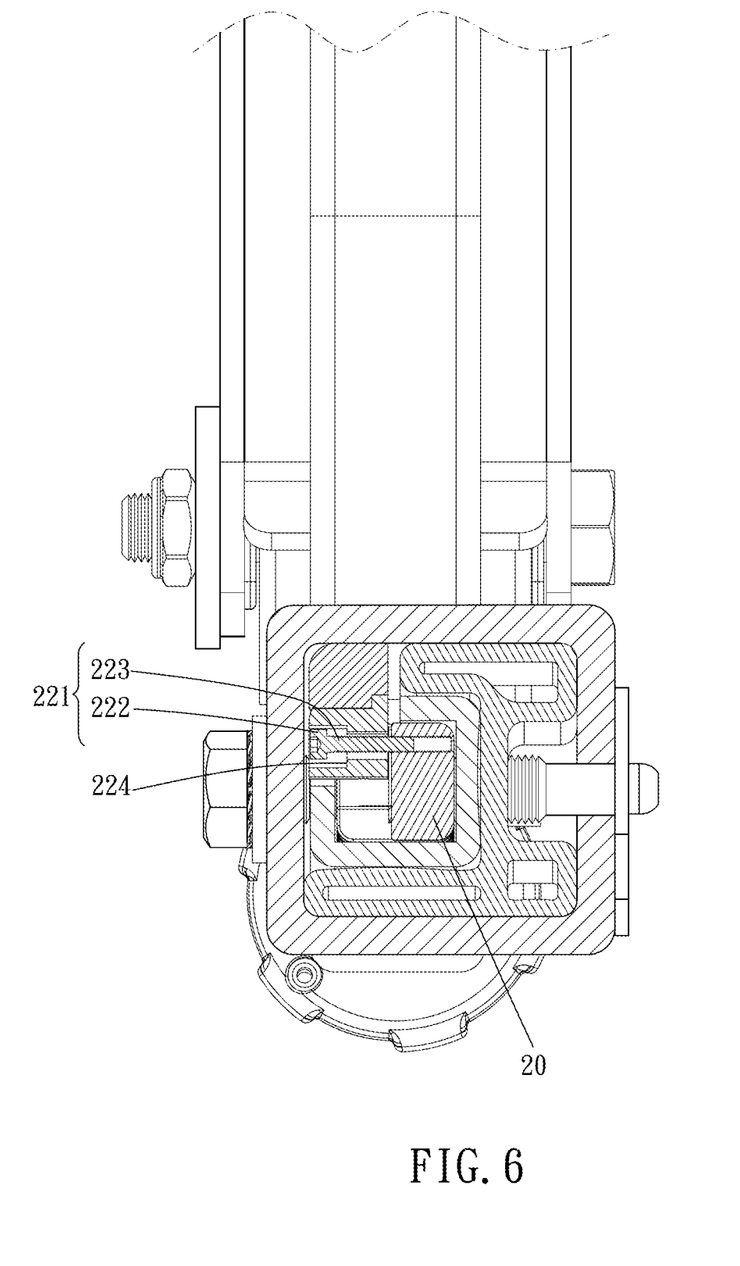
FIG. 6 is a cross-sectional view taken along line A-A of FIG. 5.
Figure 7:
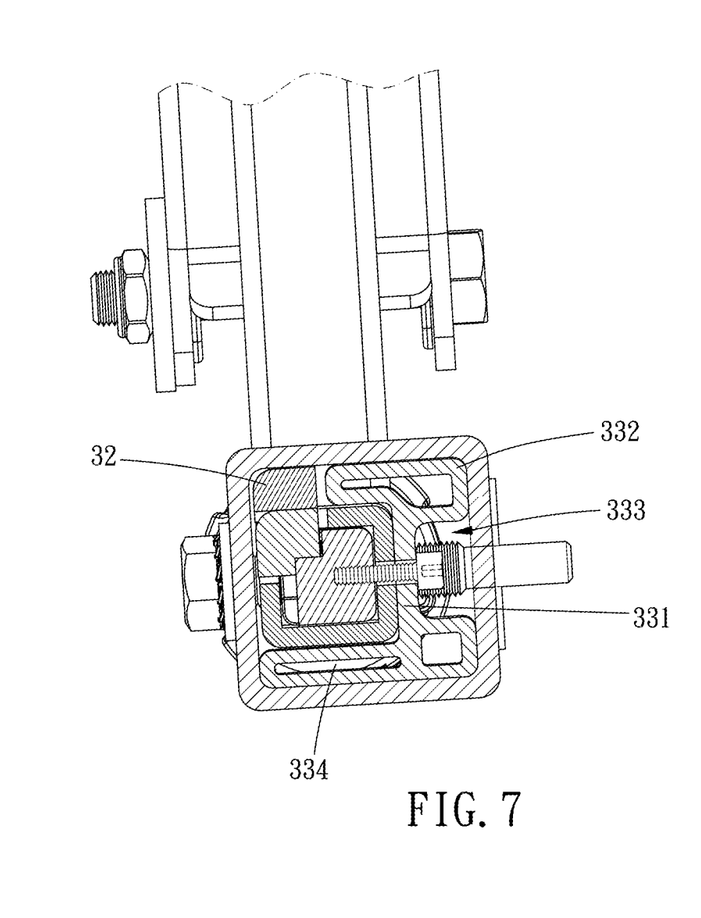
FIG. 7 is a cross-sectional view taken along line B-B of FIG. 5.
Figure 8:
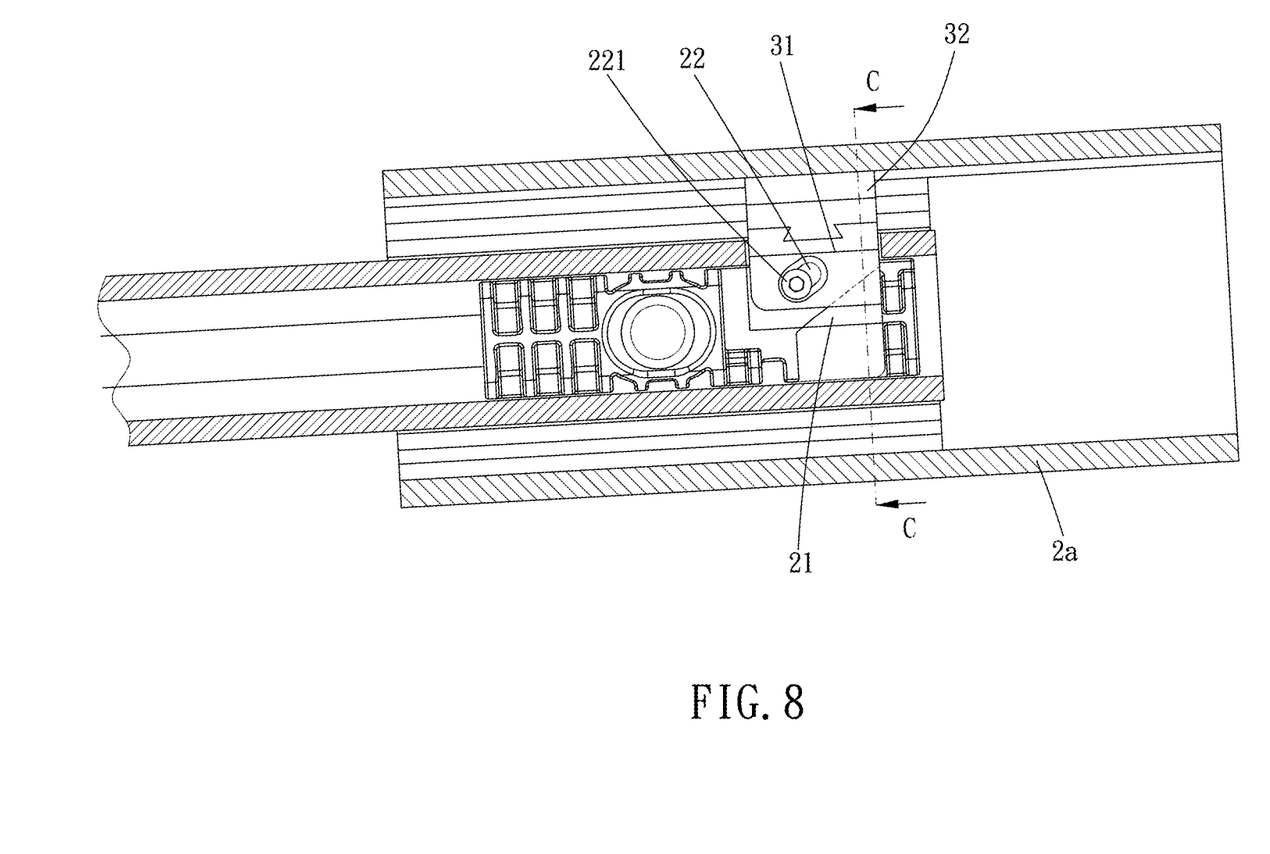
FIG. 8 is a partial cross-sectional view of a preferable embodiment of the present invention applied to another type of trailer hitch.
Figure 9:
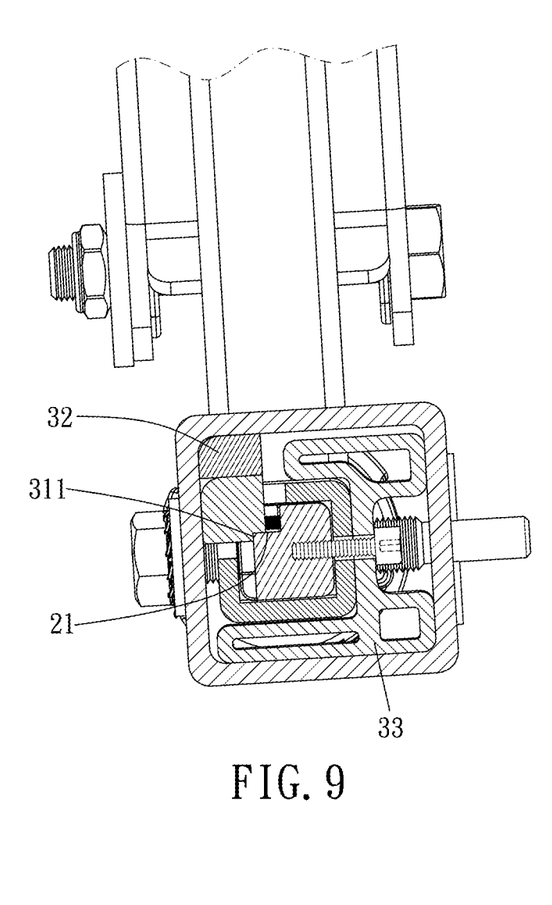
FIG. 9 is a cross-sectional view taken along line C-C of FIG. 8.
Figure 10:
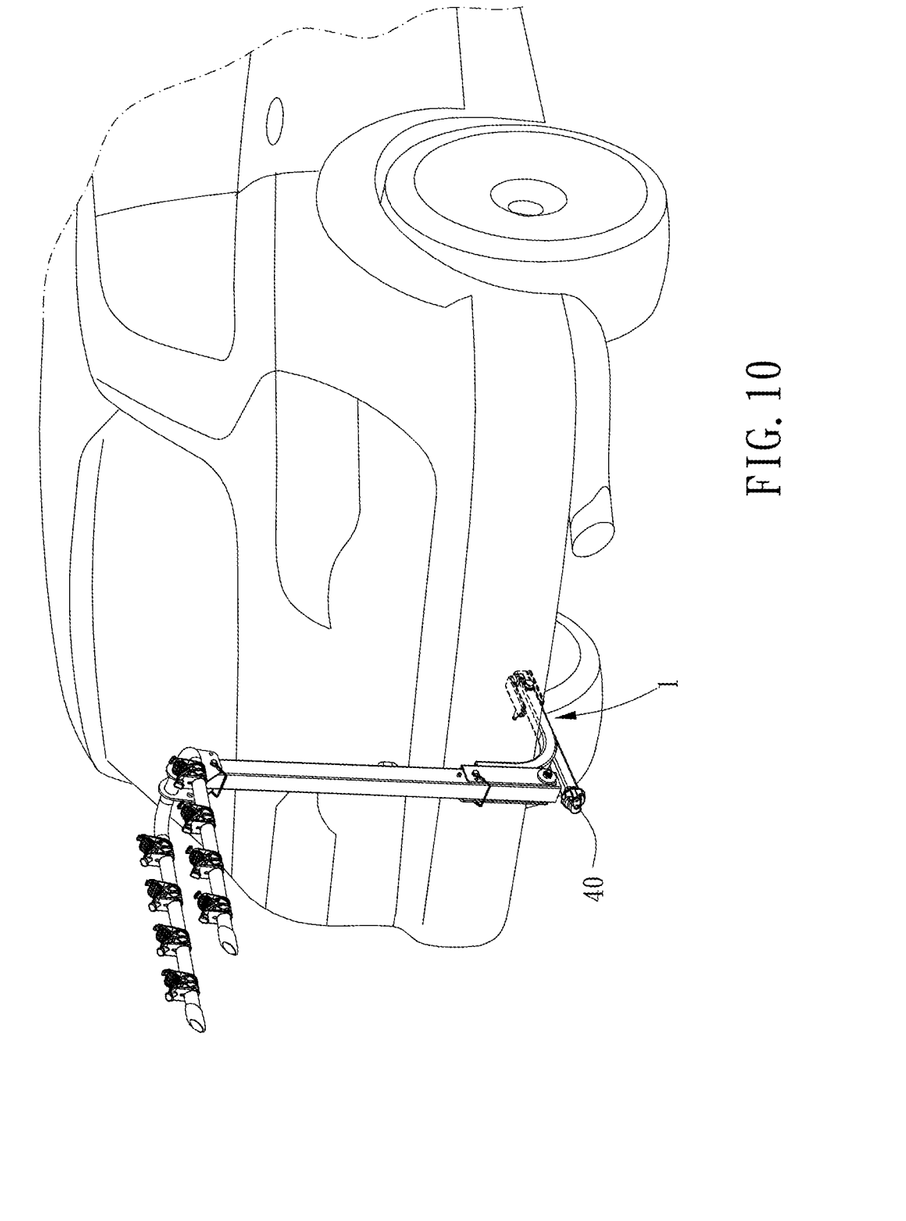
FIG. 10 is a schematic diagram of a preferable embodiment of the present invention in use.

When the assembling structure 1 is assembled to the trailer hitch 2 with a smaller diametric dimension, a distance that the spacer 32 protruding beyond the tubular member is shorter, as shown in FIGS. 5 to 7; when the assembling structure 1 is assembled to the trailer hitch 2a with a larger diametric dimension, the actuating member 40 drives the first abutting member 20 to move axially toward the operating portion 41, and the abutting portion 311 is moved along the inclined portion 21 to urge the second abutting member 31 and the spacer 32 to move radially and be abutted against the inner wall of the trailer hitch 2a, as shown in FIGS. 8 and 9. By any of the structures as described above, the assembling structure 1 is easily adjustable and configured to be stably assembled to one of the trailer hitches whose sizes are different.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An assembling structure for a vehicle carrying device, including:
   a tubular member, having an axial direction, configured to be inserted within a trailer hitch of a vehicle, a wall of the tubular member having a through hole;
   a first abutting member, being movable along the axial direction and disposed in the tubular member;
   an expansion mechanism, including a second abutting member movably disposed on the first abutting member, the second abutting member being located within the through hole and urgeable to move by the first abutting member;
   an actuating member, being connected with the first abutting member, configured to be externally operable to drive the first abutting member to move axially and urge the second abutting member to move radially; wherein one of the first abutting member and the second abutting member has an elongate hole extending obliquely relative to the axial direction, a guiding member is movably disposed within the elongate hole, and the guiding member is connected with the other of the first abutting member and the second abutting member.

2. The assembling structure for the vehicle carrying device of claim 1, wherein at least one of the first abutting member and the second abutting member includes an inclined portion tilted to the axial direction, and the other of the first abutting member and the second abutting member includes an abutting portion which is abuttable against the inclined portion.

3. The assembling structure for the vehicle carrying device of claim 2, wherein the inclined portion includes two inclined guiding surfaces which are adjacent to each other and tilted to the axial direction, the abutting portion includes two inclined abutting surfaces which are abuttable against the two inclined guiding surfaces; when the first abutting member and the second abutting member are moved relative to each other, the two inclined guiding surfaces urge the two inclined abutting surfaces.

4. The assembling structure for the vehicle carrying device of claim 1, wherein the expansion mechanism further includes a spacer which is detachably connected to the second abutting member, and the spacer protrudes beyond an outer surface of the tubular member and is configured to be abutted against an inner surface of the trailer hitch.

5. The assembling structure for the vehicle carrying device of claim 4, wherein one of the spacer and the second abutting member has an engaging convex, and the other of the spacer and the second abutting member has an engaging concave within which the engaging convex is engageable.

6. The assembling structure for the vehicle carrying device of claim 1, wherein the expansion mechanism further includes a supporting frame which is detachably connected to the tubular member, and the supporting frame is connected to at least one outer side surface of the tubular member and configured to be abutted against an inner surface of the trailer hitch.

7. The assembling structure for the vehicle carrying device of claim 6, wherein the supporting frame includes an assembling portion which is configured for at least one fastener to be disposed therethrough and connected to the wall of the tubular member and two supporting portions which are transversely connected to two opposite sides of the assembling portion, and each of the two supporting portions is abutted against and between an outer surface of the tubular member and the inner surface of the trailer hitch.

8. The assembling structure for the vehicle carrying device of claim 1, further including a pin member configured to laterally connect the trailer hitch and the tubular member, wherein the first abutting member has a penetrating hole disposed laterally therethrough and extending axially, and the pin member is disposed through the penetrating hole and the first abutting member is axially movable relative to the pin member.

9. The assembling structure for the vehicle carrying device of claim 3, wherein the tubular member is square, the through hole is disposed at a corner of the tubular member, the second abutting member is connected with a corner of the first abutting member corresponding to the through hole; the first abutting member is square and an outer peripheral surface of the first abutting member has a plurality of notches spaced apart from one another; the inclined portion is a wedge projection, the abutting portion is a recession within which the wedge projection is received; the guiding member includes a head portion and a body portion connected with the head portion, an inner surface of the elongate hole has a shoulder which is abuttable against the head portion; the expansion mechanism further includes a spacer which is detachably connected to the second abutting member, the spacer protrudes beyond an outer peripheral surface of the tubular member and is configured to be abutted against an inner surface of the trailer hitch; one of the spacer and the second abutting member has an engaging convex, and the other of the spacer and the second abutting member has an engaging concave which is engageable with the engaging convex; the engaging convex is a dovetailed tenon, and the engaging concave is a dovetailed groove which is engageable with the dovetailed tenon; the spacer further includes a dodge slot, the dodge slot is configured to receive a fastener connecting the spacer and the second abutting member; the expansion mechanism further includes a supporting frame which is detachably connected to the tubular member, the supporting frame is connected to at least one outer side surface of the tubular member and is diagonal to the through hole; the supporting frame includes an assembling portion which is configured for at least one fastener to be disposed therethrough and two supporting portions which are transversely connected to two opposite sides of the assembling portion, and each of the two supporting portions extends along a thickness direction of the assembling portion and is abutted against and between an outer peripheral wall of the tubular member and the inner surface of the trailer hitch; the supporting frame and the spacer are disposed on two opposite corners of the tubular member; the two supporting portions and the assembling portion define a receiving portion therebetween for receiving the at least one fastener; the supporting frame is integrally made in one piece; each of the two supporting portions includes at least one hollow portion extending axially; the assembling structure further includes a pin member configured to transversely connect the trailer hitch and the tubular member, the first abutting member has a penetrating hole transversely disposed therethrough and extending axially, and the pin member is disposed through the penetrating hole and the first abutting member is axially movable relative to the pin member; the pin member is a screwed rod which is configured to be screwed with at least one of the tubular member and the trailer hitch, an annular pad is configured to be disposed between a head of the screwed rod and the trailer hitch, the annular pad includes a ring and a plurality of fins which are radially tilted and disposed circumferentially on the ring; the actuating member includes an operating portion configured to be externally operable and a rod member non-rotatably connected with the operating portion, the rod member is screwed with one of the tubular member and the first abutting member.

\* \* \* \* \*